US012705128B2

(12) United States Patent
Uribe et al.

(10) Patent No.: US 12,705,128 B2
(45) **Date of Patent: *Aug. 11, 2026**

(54) ERROR DETECTION SIGNALING

(71) Applicant: Micron Technology, Inc., Boise, ID (US)

(72) Inventors: Melissa I. Uribe, El Dorado Hills, CA (US); Aaron P. Boehm, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/954,300

(22) Filed: Nov. 20, 2024

(65) Prior Publication Data

US 2025/0130878 A1 Apr. 24, 2025

Related U.S. Application Data

(63) Continuation of application No. 18/068,152, filed on Dec. 19, 2022, now Pat. No. 12,164,368.

(60) Provisional application No. 63/266,092, filed on Dec. 28, 2021.

(51) Int. Cl.
*G06F 11/07* (2006.01)

(52) U.S. Cl.
CPC ........ *G06F 11/0772* (2013.01); *G06F 11/073* (2013.01); *G06F 11/079* (2013.01)

(58) Field of Classification Search
CPC ... G06F 11/0772; G06F 11/073; G06F 11/079
USPC ...................................................... 714/57, 49
See application file for complete search history.

(56) References Cited

U.S. PATENT DOCUMENTS 5,357,530 A 10/1994 Lee et al.
12,099,746 B2 * 9/2024 Balb .................... G06F 3/0679
2006/0101304 A1 5/2006 Miura
2006/0176167 A1 8/2006 Dohrmann (Continued)

FOREIGN PATENT DOCUMENTS

DE 4234157 A1 4/1993
KR 10-2021-0026201 A 3/2021
WO WO-2020257044 A1 * 12/2020 ............ G11C 29/12

OTHER PUBLICATIONS

"International Search Report and Written Opinion of the International Searching Authority," issued in connection with Int'l Appl. No. PCT/US2022/082056, dated Apr. 24, 2023 (11 pages).

*Primary Examiner* — Chae M Ko
(74) *Attorney, Agent, or Firm* — Holland & Hart LLP

(57) ABSTRACT

Methods, systems, and devices for error detection signaling are described. In some examples, a memory device may include circuitry to detect one or more error conditions. As the memory device is operated, it may store or output a value (e.g., a high value, a "1") indicating the absence of an error condition. Upon the occurrence of an error condition, the memory device may either store or output a value (e.g., a low value, a "0"), which may allow for the error to be corrected or mitigated. Because storing or driving the value signifying the error condition may require a driver of the memory device to be coupled with a power supply, storing or outputting the value signifying an absence of an error condition (e.g., unless a normal or valid condition is detected) may mitigate errors that would otherwise render a safety mechanism of the memory device ineffective.

20 Claims, 9 Drawing Sheets

(56) References Cited

U.S. PATENT DOCUMENTS

| | | | | |
|---|---|---|---|---|
| 2011/0113306 | A1 | 5/2011 | Eggleston et al. | |
| 2012/0023363 | A1 | 1/2012 | Shaeffer et al. | |
| 2013/0339590 | A1 | 12/2013 | Tsuruda et al. | |
| 2020/0201718 | A1 | 6/2020 | Richter et al. | |
| 2020/0225717 | A1 | 7/2020 | Duva et al. | |
| 2021/0064462 | A1 | 3/2021 | Eun et al. | |
| 2022/0180958 | A1* | 6/2022 | Kim | G11C 29/18 |
| 2023/0062939 | A1* | 3/2023 | Boehm | G06F 11/073 |
| 2023/0222032 | A1* | 7/2023 | Jenkinson | G06F 11/0727 714/764 |

* cited by examiner

600

ERROR DETECTION SIGNALING

CROSS REFERENCE

The present Application for is a continuation of U.S. patent application Ser. No. 18/068,152 by URIBE et al., entitled "ERROR DETECTION SIGNALING," filed Dec. 19, 2022, which claims priority to U.S. Patent Application No. 63/266,092 by URIBE et al., entitled "ERROR DETECTION SIGNALING," filed Dec. 28, 2021, each of which is assigned to the assignee hereof, and each of which is expressly incorporated by reference herein.

FIELD OF TECHNOLOGY

The following relates generally to one or more systems for memory and more specifically to error detection signaling.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
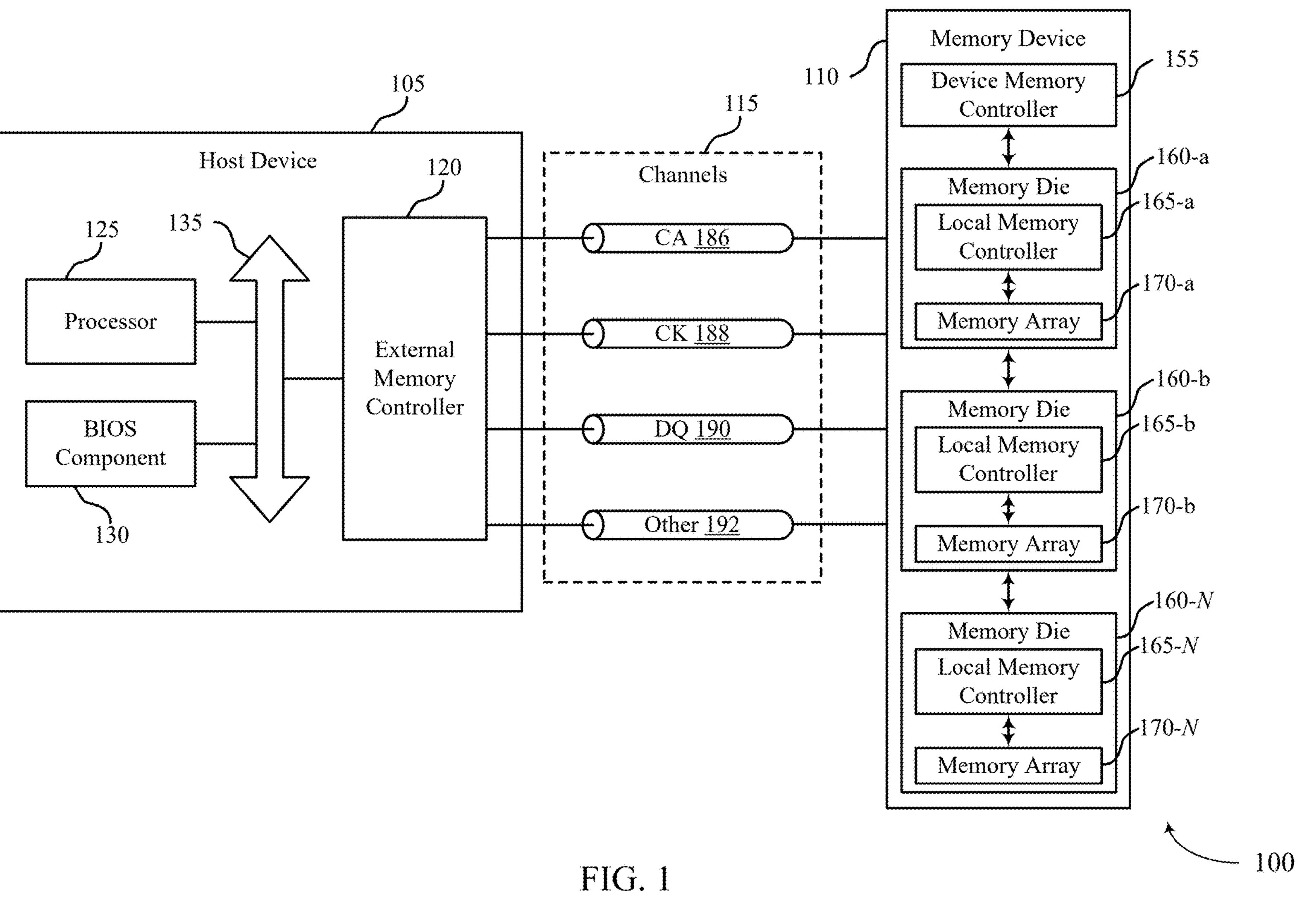
FIG. 1 illustrates an example of a system that supports error detection signaling in accordance with examples as disclosed herein.

Some memory devices may include circuitry configured to detect errors associated with various operations or various components of the memory device. Such memory devices may be incorporated in environments such as vehicle safety systems, autonomous vehicle systems, or other safety-critical systems, that may have strict requirements regarding undetected failure rates (FITs). For example, failures of safety mechanisms (e.g., circuits) may result in undesirably high FITs, as well as faults to other circuitry or signals that result in the memory device failing to provide valid data.

Traditionally, such memory devices may be configured to store or drive a first value (e.g., a high value, a "1") when an error condition exists, and may store or drive a second value (e.g., a low value, a "0") when no error conditions exist. That is, a register or pin may be asserted (e.g., driven to a high value or "1" state) upon detection of an error condition. However, any faults or errors associated with voltage supplies, clock signals, reset signals, or the like may result in the memory device being at least temporarily unable to actively drive the first value when an error condition exists. As described herein, enhancement to FIT may be provided by asserting a register or pin upon detection of a normal or valid condition of one or more circuits including circuits asserting the register or pin. Accordingly, circuitry configured to store or drive the first value (e.g., the high value, a "1") when a normal or valid condition exists (e.g., no error condition exists) and store or output the second value (e.g., the low value, a "0") when an error condition exists may increase the overall reliability and safety of the memory device.

A memory device having circuitry configured to store or drive a first value (e.g., a high value, a "1") when no error condition exists and store or output a second value (e.g., a low value, a "0") when an error condition exits is described herein. For example, the memory device may include circuitry to detect the presence or absence of error conditions associated with access operations, a power supply, clock signaling, and the like. Moreover, the memory device may either output signaling directly (e.g., via one or more pins) indicating the presence or absence of an error condition, or may store one or more values (e.g., to a register) indicating the presence or absence of the error condition. In some instances, the memory device may output signaling indicating the contents of the register based on receiving a request (e.g., a command) to read the register.

Because storing or driving the first value (e.g., a high value, a "1") may require a driver of the memory device to be coupled with a power supply (e.g., a positive voltage source or positive bias), storing or outputting the second value (e.g., a low value, a "0") unless a normal or valid condition is detected may mitigate errors that would otherwise render the safety mechanism ineffective. In other words, the memory device may output the second value when error conditions relating to its power supply, clock signaling, or other circuits involved in output of signals occur. Accordingly, storing or outputting the second value unless a normal or valid condition exists may mitigate any faults or errors associated with voltage supplies, clock signals, reset signals, or the like that would otherwise result in the memory device being unable to drive the first value when an error condition exists.

Features of the disclosure are initially described in the context of systems and dies as described with reference to FIGS. 1 and 2. Features of the disclosure are described in the context of a system and process flow diagrams as described with reference to FIGS. 3-5. These and other features of the disclosure are further illustrated by and described with reference to an apparatus diagram and flowcharts that relate to error detection signaling as described with reference to FIGS. 6-9.

FIG. 1 illustrates an example of a system 100 that supports error detection signaling in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 (e.g., memory die 160-*a*, memory die 160-*b*, memory die 160-N) may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, the memory device 110 may be configured to output signaling via one or more pins (e.g., directly or from a register of the memory device 110) indicating the presence or absence of one or more error conditions. For example, the memory device 110 may include circuitry configured to detect the occurrence of an error associated with a power supply of the memory device 110, an error associated with a clock of the memory device 110, an error associated with an access operation performed on the memory device 110, or the like. In some examples, multiple errors may be detected or errors may be detected in parallel (e.g., an error associated with a clock of the memory device may be detected upon receiving an access command).

When no errors are detected (e.g., when the memory device 110 detects a normal condition), the device memory controller 155 may output signaling (e.g., by actively driving one or more pins) to the host device 105 that indicates a first value (e.g., a high value, a "1"). In some examples, the signaling may be output directly (e.g., via one or more pins upon the non-occurrence of the error), while in other examples the first value may be stored to a register. The first value (and other contents of the register) may be output upon receiving a request (e.g., a command) from the host device 105.

In other examples, when an error condition is detected, the device memory controller 155 may output signaling (e.g., via one or more pins) to the host device 105 that indicates a second value (e.g., a low value, a "0"). The signaling may be output directly (e.g., via one or more pins upon the occurrence of the error), while in other examples the second value may be stored to a register and subsequently output based on receiving a request (e.g., a command) from the host device 105. By storing or outputting the second value unless a normal or valid condition exists, the memory device 110 may mitigate any faults or errors associated with voltage supplies, clock signals, reset signals, or the like that would otherwise result in the memory device 110 being unable to drive the first value when an error condition exists.

Figure 2:
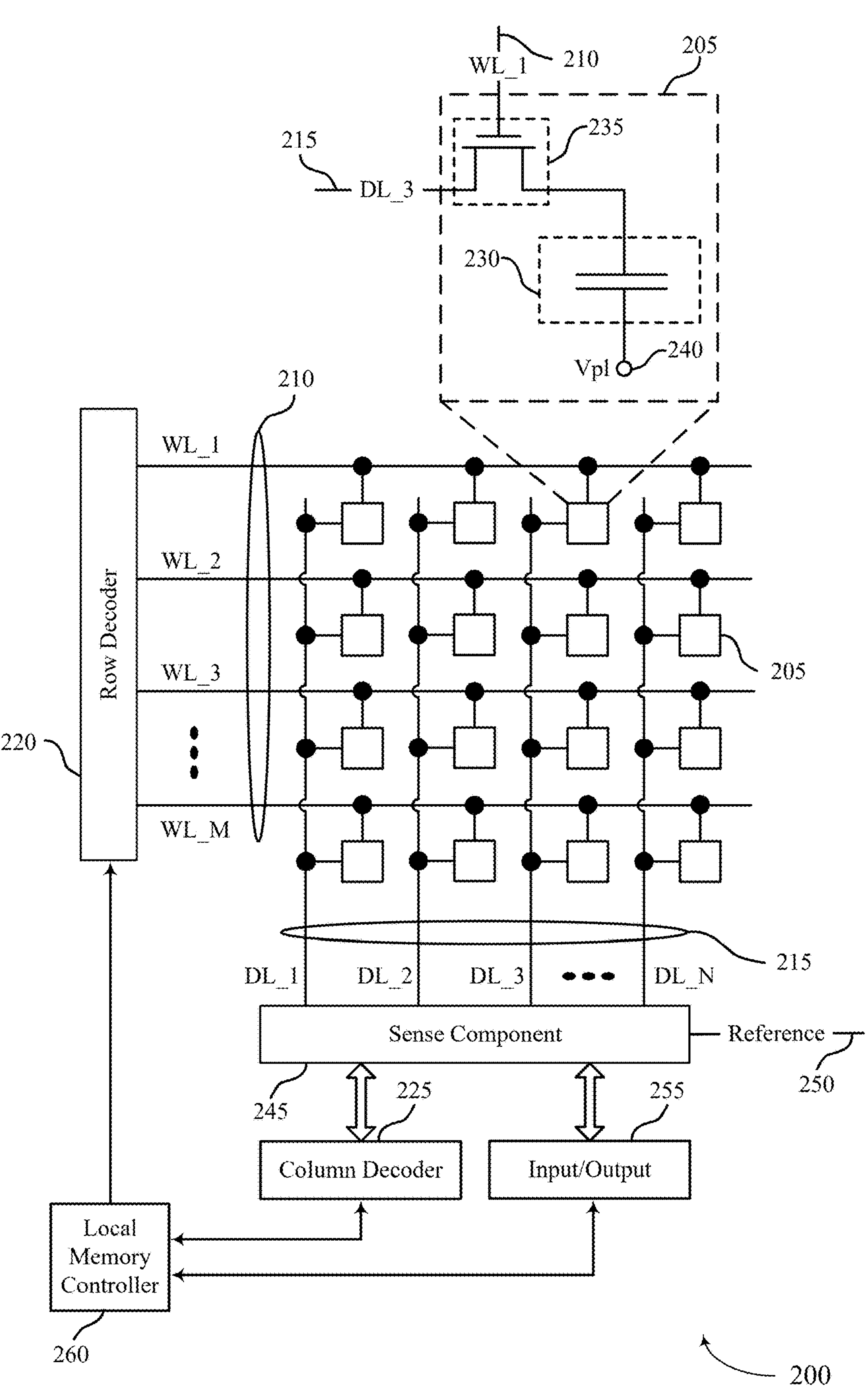
FIG. 2 illustrates an example of a memory die that supports error detection signaling in accordance with examples as disclosed herein.

FIG. 2 illustrates an example of a memory die 200 that supports error detection signaling in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

In some examples, the memory die 200 may be configured to output signaling via one or more pins (e.g., directly or from a register of the memory die 200) indicating the presence or absence of one or more error conditions. For example, the memory die 200 may include circuitry configured to detect the occurrence of an error associated with a power supply of the memory die 200, an error associated with a clock of the memory die 200, an error associated with an access operation performed on the memory die 200, or the like. In some examples, multiple errors may be detected or errors may be detected in parallel (e.g., an error associated with a clock of the memory device may be detected upon receiving an access command).

When no errors are detected (e.g., when the memory die 200 detects a normal condition), the local memory controller 260 may output signaling (e.g., by actively driving one or more pins) to the host device that indicates a first value (e.g., a high value, a "1"). In some examples, the signaling may be output directly (e.g., via one or more pins upon the non-occurrence of the error), while in other examples the first value may be stored to a register. The first value (and other contents of the register) may be output upon receiving a request (e.g., a command) from the host device.

In other examples, when an error condition is detected, the local memory controller 260 may output signaling (e.g., via one or more pins) to the host device that indicates a second value (e.g., a low value, a "0"). The signaling may be output directly (e.g., via one or more pins upon the occurrence of the error), while in other examples the second value may be stored to a register and subsequently output based on receiving a request (e.g., a command) from the host device. By storing or outputting the second value unless a normal or valid condition exists, the memory die 200 may mitigate any faults or errors associated with voltage supplies, clock signals, reset signals, or the like that would otherwise result in the memory die 200 being unable to drive the first value when an error condition exists.

Figure 3:
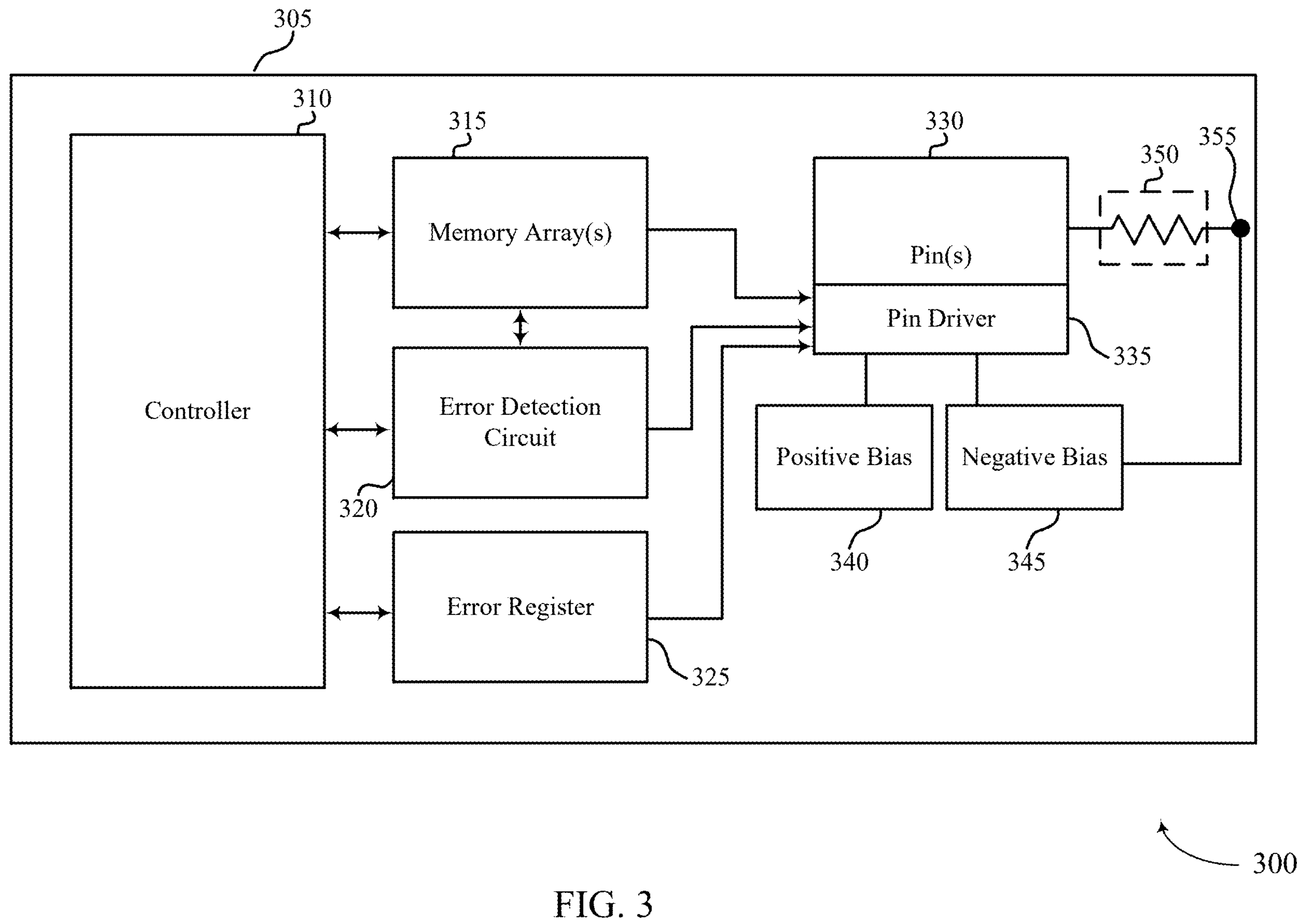
FIG. 3 illustrates an example of a memory system that supports error detection signaling in accordance with examples as disclosed herein.

FIG. 3 illustrates an example of a memory system 300 that supports error detection signaling in accordance with examples as disclosed herein. The memory system 300 may include a memory device 305, which may be an example of the memory device 110 described with reference to FIG. 1. The memory device 305 may include a controller 310, one or more memory arrays 315, an error detection circuit 320, an error register 325, one or more pins 330, a pin driver 335, a positive bias 340 and a negative bias 345. In some examples, the positive bias 340 may be coupled with one or more supply pins of the memory device 305 that may be supplied by an external voltage source. Alternatively, the positive bias 340 may be generated on the memory device 305 from an external supply. The negative bias 345 may be coupled with one or more negative bias or ground pins of the memory device 305, or may be generated on the memory device 305 from an external supply. In some examples, one or more pins 330 of the memory device 305 may be coupled with a signal trace that includes at least one resistor 350 and a node 355. The node 355 may be coupled with one of the positive bias 340 or the negative bias 345, and the resistor 350 and node 355 may be external to the memory device 305.

The memory device 305 may be configured to detect the occurrence (or non-occurrence) of one or more error conditions and may be configured to store a value (e.g., to the error register 325) and/or output signaling indicating the occurrence (or non-occurrence) of the error condition. For example, when no errors are detected (e.g., when the memory device 305 detects a normal condition), the memory device 305 may store and/or output signaling (e.g., via one or more pins 330) that indicates a first value (e.g., a high value, a "1"). Additionally or alternatively, when an error condition is detected, the memory device 305 may store and/or output signaling (e.g., via one or more pins 330) that indicates a second value (e.g., a low value, a "0"). By storing or outputting the second value unless a normal or valid condition exists, the memory device 305 may mitigate any faults or errors associated with voltage supplies, clock signals, reset signals, or the like that would otherwise result in the memory device 305 being unable to drive the first value when an error condition exists.

As described herein, an error condition may refer to an occurrence of an error associated with a power supply of the memory device 305, an error associated with a clock of the memory device 305 (e.g., a clock of the controller 310), an error associated with an access operation performed on the memory device 305. Accordingly, the error detection circuit 320 may be coupled with the memory array(s) 315 and/or other components of the memory device and may detect the occurrence of an error condition. For example, when an error condition is detected, the error detection circuit 320 may transmit signaling to the controller 310 or to the pin(s) 330 indicating the occurrence of the error.

The controller 310 may be coupled with a host device (not shown), such as a host device 105 described with reference to FIG. 1. The controller 310 may receive commands from the host device and process the commands at the memory array(s) 315. In some examples, the controller 310 may be coupled with the error register 325. The error register 325, which may be an example of a mode register, may be configured to store data relating to errors detected at the memory device 305 (e.g., by the error detection circuit 320). For example, the controller 310 may store a first value (e.g., a "1") to the error register 325 upon the occurrence of a normal condition and may store a second value (e.g., a "0") upon the occurrence of an error condition.

Additionally or alternatively, the controller 310 may store other data to the error register 325 that identifies a type or a location of a particular error condition. That is, the controller 310 may be configured to store multiple bits of data that indicate a type of error condition and a location of an error condition. For example, the controller 310 may store multiple bits of data to the error register 325 where the value "0 . . . 0" represents an invalid condition or signifies the occurrence of an error.

In some instances, after storing data to the error register 325, the controller 310 may receive a command (e.g., a request) to read the error register 325. Upon receiving the request to read the error register 325, the controller 310 may retrieve (e.g., read) the contents of the error register 325 and may output (e.g., transmit) the contents to the host device. In some instances, the contents of the error register 325 may be output via one or more pins 330. For example, the pin(s) 330 may output a first value indicating a normal condition and a second value indicating an error condition associated with the memory device 305.

As described herein, the controller 310 may receive and process commands (e.g., access commands) at the memory array(s) 315. In some examples, the memory array(s) 315 may include one or more volatile memory cells, such as DRAM memory cells. In other examples, the memory array(s) 315 may include one or more non-volatile memory cells, such as FeRAM or Flash memory (e.g., NAND Flash memory). The types of memory cells and the quantity of memory arrays 315 included in the memory device 305 may be a matter of design choice.

The memory device 305 may also include one or more pins 330 that are coupled with a pin driver 335. In some examples, the pins 330 may be electrical contacts that are coupled with various components of the memory device 305 or other external components (e.g., a host device). The pin driver 335 may include components (e.g., transistors) that are configured to couple any combination of pins 330 to the positive bias 340 or the negative bias 345. For example, the pin driver 335 may be configured to drive one or more pins 330 to a first value (e.g., a high value, a "1") or a second value (e.g., a low value, a "0") based on an input from the memory array 315, error detection circuit 320, or error register 325. For example, to drive the pin 330 to the first value, the pin driver 335 may couple the pin 330 (e.g., via a switch or transistor) to the positive bias 340. To drive the pin 330 to the second value, the pin driver 335 may couple the pin 330 (e.g., via a switch or transistor) to the negative bias 345. In some examples, the pin(s) 330 may include at least one data mask/invert (DMI) pin and at least one special function enable (DSF) pin.

In some examples, one or more pins 330 may be associated with a termination voltage. For example, a pin 330 (e.g., a DMI pin 330 or a DRS pin 330) may be coupled with a signal trace (not shown) and the signal trace may be coupled with a resistor 350. The resistor 350 may be coupled with a node 355 that is coupled with one of the negative bias 345 or the positive bias 340, which represents the termination voltage of the pin 330. Upon an occurrence of an error condition (e.g., detected by the error detection circuit 320), at least one pin 330 may be coupled with the negative bias 345, which may result in signaling being transmitted to the host device (e.g., via the node 355) that indicates the occurrence of the error condition.

The pin driver 335 may be coupled with the positive bias 340. As described herein, the positive bias 340 may be coupled with one or more supply pins of the memory device 305 that may be supplied by an external voltage source. Alternatively, the positive bias 340 may be generated on the memory device 305 from an external supply. Accordingly, when a normal condition is detected (e.g., when no errors are detected by the error detection circuit 320), the pin 330 may be coupled with the positive bias 340, which may drive the pin 330 to a first value (e.g., to a high value, to a "1"). The pin(s) 330 that are driven to the high value may communicate signaling to a host device (not shown), such that the host device receives a first value indicating a normal condition associated with the memory device 305.

Moreover, the negative bias 345 may be coupled with the node 355 and may include a negative voltage input or a ground voltage. Additionally or alternatively, the negative bias 345 may be coupled with one or more negative bias or ground pins of the memory device 305, or may be generated on the memory device 305 from an external supply. Accordingly, when an error condition is detected (e.g., when one or more errors are detected by the error detection circuit 320), the pin driver 335 may couple one or more pins 330 to the negative bias 345. The pin(s) 330 that are maintained at the negative or ground voltage may be coupled with a host device (not shown), such that the host device receives a second value indicating an occurrence of an error condition associated with the memory device 305. As described herein, outputting the second value unless a normal or valid condition exists may mitigate any faults or errors associated with voltage supplies, clock signals, reset signals, or the like that would otherwise result in the memory device 305 being unable to drive the first value when an error condition exists.

Figure 4:
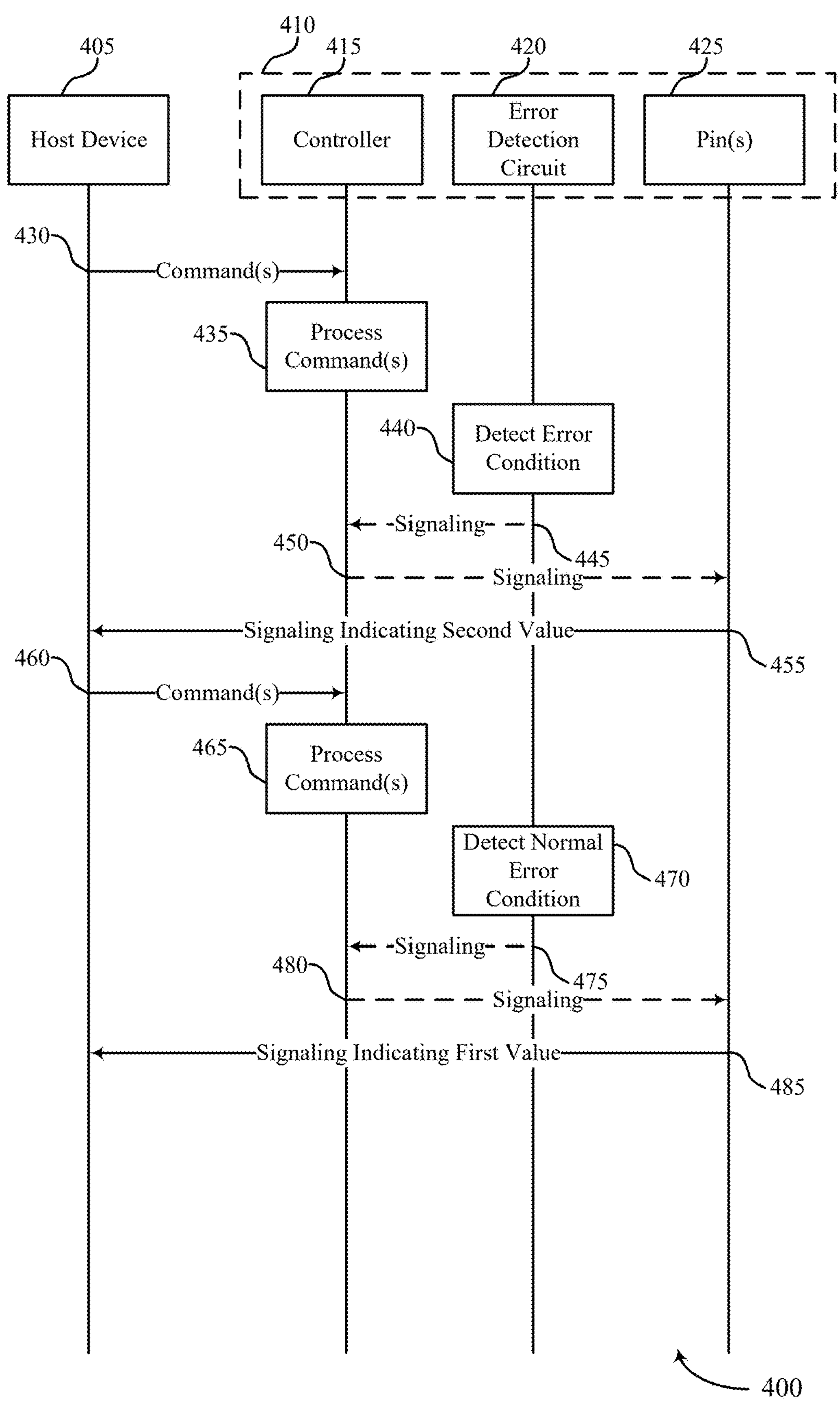
FIG. 4 illustrates an example of a process flow diagram that supports error detection signaling in accordance with examples as disclosed herein.

FIG. 4 illustrates an example of a process flow diagram 400 that supports error detection signaling in accordance with examples as disclosed herein. The process flow diagram 400 may illustrate operations performed by a host device 405 and a memory device 410. In some examples the host device 405 may be an example of the host device 105 as described with reference to FIG. 1 and the memory device 410 may be an example of the memory device 305 as described with reference to FIG. 3. The memory device 410 may include a controller 415, an error detection circuit 420, and one or more pins 425, which may be respective examples of the controller 310, the error detection circuit 320, and the pin(s) 330 as described with reference to FIG. 3. The memory device 410 may include other components that are not shown, such as one or more memory arrays, an error register, a pin driver, a positive bias, and a negative bias as described with reference to FIG. 3, among other features.

The memory device 410 may be configured to detect the occurrence (or non-occurrence) of one or more error conditions and may output signaling indicating the occurrence (or non-occurrence) of the error condition. For example, when no errors are detected (e.g., when the memory device 410 detects a normal condition), the memory device 410 may output signaling that indicates a first value (e.g., a high value, a "1"). Additionally or alternatively, when an error condition is detected, the memory device 410 may output signaling that indicates a second value (e.g., a low value, a "0"). By outputting the second value unless a normal or valid condition exists, the memory device 410 may mitigate any faults or errors associated with voltage supplies, clock signals, reset signals, or the like that would otherwise result in the memory device 410 being unable to drive the first value when an error condition exists.

At 430, the host device 405 may transmit a plurality of commands to the memory device 410. The commands may be access commands, such as read commands or write commands to be performed at one or more memory arrays of the memory device 410. At 435, the controller 415 may receive and perform (e.g., execute) the commands at the respective memory array(s).

At 440, the error detection circuit 420 may detect an error condition associated with the memory device 410. As described herein, the error condition may be associated with a power supply of the memory device 410, a clock of the memory device 410 (e.g., a clock of the controller 415), and/or one or more access operations performed by the controller 415 (e.g., at 435). At 445, the error detection circuit 420 may transmit signaling to the controller 415 indicating the occurrence of the error condition. However, in other examples (not shown) the error detection circuit 420 may instead transmit the signaling directly to the pin(s) 425.

At 450, the controller 415 may transmit signaling to the pin(s) 425. For example, the controller 415 may transmit signaling to a pin driver (not shown) coupled with the pin(s) 425 that results in the pin driver refraining from driving a DMI or DSF pin (or driving the DMI or DSF pin to a negative bias). Accordingly, the DMI or DSF pin may be coupled with a negative bias (e.g., a negative bias 345 as described with reference to FIG. 3), which may drive the DMI or DSF pin to a termination voltage. Accordingly, the DMI or DSF pin may output a second value (e.g., a low value, a "0") that indicates the occurrence of the error condition.

At 455, signaling indicating the second value may be transmitted to the host device 405 (e.g., via a signal trace). By outputting the second value unless a normal or valid condition exists, the memory device 410 may mitigate any faults or errors associated with voltage supplies, clock signals, reset signals, or the like that would otherwise result in the memory device 410 being unable to actively drive the first value when an error condition exists.

At 460, the host device 405 may transmit a second plurality of commands to the memory device 410. The second plurality of commands may be access commands, such as read commands or write commands to be performed at one or more memory arrays of the memory device 410. At 465, the controller 415 may receive and perform (e.g., execute) the second plurality of commands at the respective memory array(s).

At 470, the error detection circuit 420 may detect a normal condition associated with the memory device 410. As described herein, a normal condition may refer to the non-occurrence of an error at the memory device 410. At 475, the error detection circuit 420 may transmit signaling to the controller 415 indicating the occurrence of the normal condition (e.g., the non-occurrence of any errors while processing the second plurality of commands). However, in other examples (not shown) the error detection circuit 420 may instead transmit the signaling directly to the pin(s) 425.

At 480, the controller 415 may transmit signaling to the pin(s) 425. For example, the controller 415 may transmit signaling to a pin driver (not shown) coupled with the pin(s) 425 that results in the pin driver driving a DMI or DSF pin. Accordingly, the pin driver may drive the DMI or DSF pin using a positive bias (e.g., the positive bias 340 as described with reference to FIG. 3). Accordingly, the DMI or DSF pin may be driven to and output a first value (e.g., a high value, a "1") that indicates the occurrence of the normal condition.

At 455, signaling indicating the first value may be transmitted to the host device 405 (e.g., via a signal trace). By outputting the first value upon the occurrence of a normal condition, the memory device 410 may have the requisite power to actively drive the DMI or DSF pin to the first value when a normal condition exists.

Figure 5:
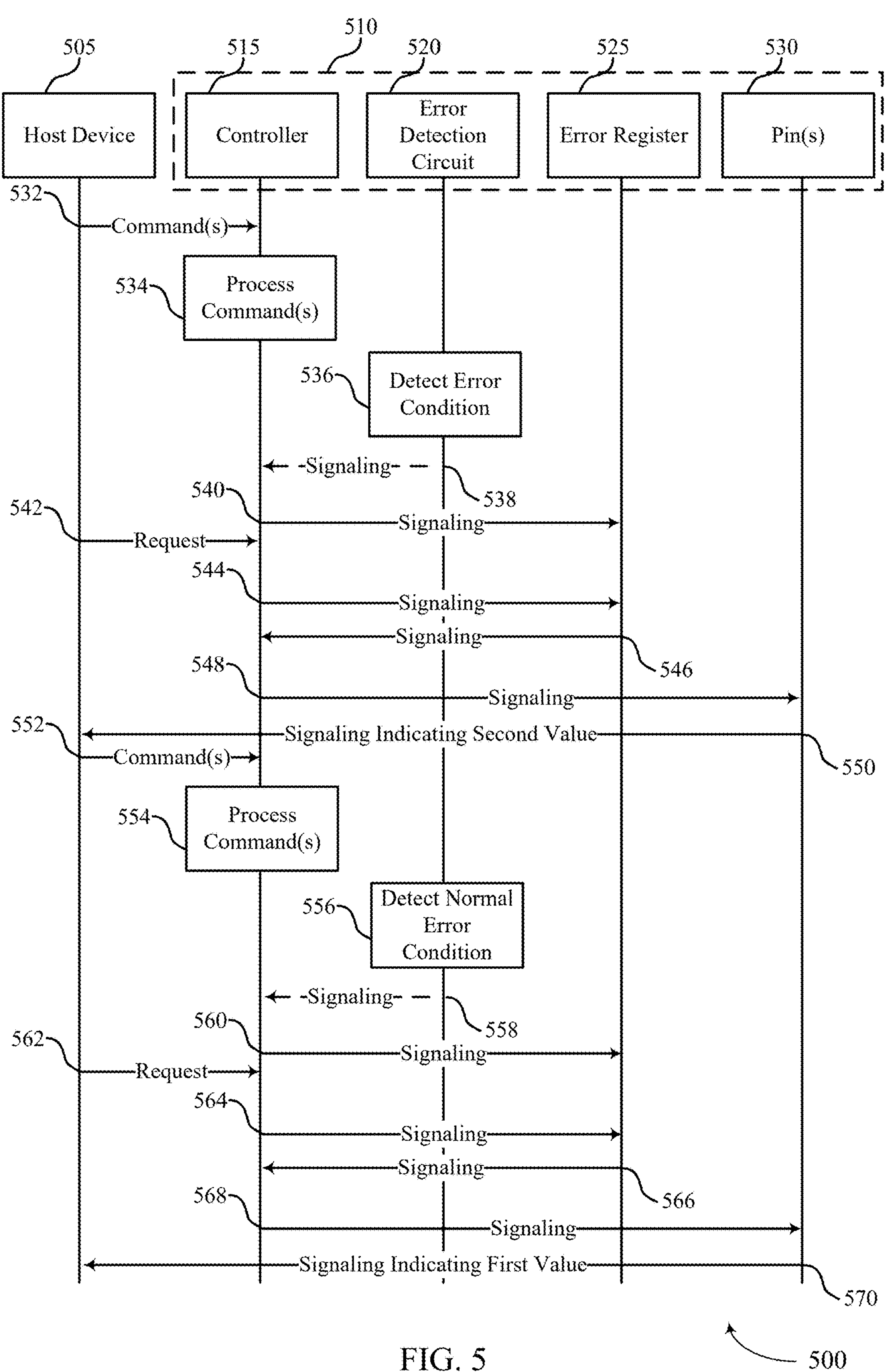
FIG. 5 illustrates an example of a process flow diagram that supports error detection signaling in accordance with examples as disclosed herein.

FIG. 5 illustrates an example of a process flow diagram 500 that supports error detection signaling in accordance with examples as disclosed herein. The process flow diagram 500 may illustrate operations performed by a host device 505 and a memory device 510. In some examples the host device 505 may be an example of the host device 105 as described with reference to FIG. 1 and the memory device 510 may be an example of the memory device 305 as described with reference to FIG. 3. The memory device 510 may include a controller 515, an error detection circuit 520, an error register 525, and one or more pins 530, which may be respective examples of the controller 310, the error detection circuit 320, the error register 325, and the pin(s) 330 as described with reference to FIG. 3. The memory device 510 may include other components that are not shown, such as one or more memory arrays, a pin driver, a positive bias, and a negative bias as described with reference to FIG. 3, among other features.

The memory device 510 may be configured to detect the occurrence (or non-occurrence) of one or more error conditions and may store a value representing the occurrence (or non-occurrence) of the error condition to the error register 525. For example, when no errors are detected (e.g., when the memory device 510 detects a normal condition), the memory device 510 may store a first value (e.g., a "1") to the error register 525. Additionally or alternatively, when an error condition is detected, the memory device 410 may store a second value (e.g., a "0") to the error register 525. By storing the second value unless a normal or valid condition exists (and subsequently outputting signaling indicating the second value), the memory device 510 may mitigate any faults or errors associated with voltage supplies, clock signals, reset signals, or the like that would otherwise result in the memory device 510 being unable to drive the first value when an error condition exists.

At 532, the host device 505 may transmit a plurality of commands to the memory device 510. The commands may be access commands, such as read commands or write commands to be performed at one or more memory arrays of the memory device 510. At 534, the controller 515 may receive and perform (e.g., execute) the commands at the respective memory array(s).

At 536, the error detection circuit 520 may detect an error condition associated with the memory device 510. As described herein, the error condition may be associated with a power supply of the memory device 510, a clock of the memory device 510 (e.g., a clock of the controller 515), and/or one or more access operations performed by the controller 515 (e.g., at 534). At 538, the error detection circuit 520 may transmit signaling to the controller 515 indicating the occurrence of the error condition. However, in other examples (not shown) the error detection circuit 520 may instead transmit the signaling directly to the error register 525.

At 540, the controller 515 may transmit signaling to the error register 525. The signaling may store a second value (e.g., a "0") to the error register 525 that indicates the occurrence of the error condition. In some examples, the signaling may indicate other information such as where the error occurred, the type of error that occurred, and the like. At 542, the host device 505 may transmit a request to the memory device 510. The request may be received by the controller 515 and may be a request (e.g., a command) to read the contents of the error register 525.

At 544, the controller 515 may transmit signaling to the error register 525. The signaling may result in the contents of the error register 525 being read. At 546, the error register 525 may transmit signaling to the controller 515. The signaling may include the contents of the error register 525. At 548, the controller 515 may transmit signaling to the pin(s) 530. For example, the controller 515 may transmit signaling to a pin driver (not shown) coupled with the pin(s) 530 that results in the pin driver refraining from driving a DMI or DSF pin. Accordingly, the DMI or DSF pin may be coupled with a negative bias (e.g., a negative bias 345 as described with reference to FIG. 3), which may drive the DMI or DSF pin to a termination voltage. Accordingly, the DMI or DSF pin may output a second value (e.g., a low value, a "0") that indicates the occurrence of the error condition.

At 550, signaling indicating the second value may be transmitted to the host device 505 (e.g., via a signal trace). By storing and subsequently outputting the second value unless a normal or valid condition exists, the memory device 510 may mitigate any faults or errors associated with voltage supplies, clock signals, reset signals, or the like that would otherwise result in the memory device 510 being unable to actively drive the first value when an error condition exists.

At 552, the host device 505 may transmit a second plurality of commands to the memory device 510. The second plurality of commands may be access commands, such as read commands or write commands to be performed at one or more memory arrays of the memory device 510. At 554, the controller 515 may receive and perform (e.g., execute) the second plurality of commands at the respective memory array(s).

At 556, the error detection circuit 520 may detect a normal condition associated with the memory device 510. As described herein, a normal condition may refer to the non-occurrence of an error at the memory device 510. At 575, the error detection circuit 520 may transmit signaling to the controller 515 indicating the occurrence of the normal condition (e.g., the non-occurrence of any errors while processing the second plurality of commands). However, in other examples (not shown) the error detection circuit 420 may instead transmit the signaling directly to the error register 525.

At 560, the controller 515 may transmit signaling to the error register 525. The signaling may store a first value (e.g., a "1") to the error register 525 that indicates the occurrence of the normal condition (e.g., the non-occurrence of the error). At 562, the host device 505 may transmit a request to the memory device 510. The request may be received by the controller 515 and may be a request (e.g., a command) to read the contents of the error register 525.

At 564, the controller 515 may transmit signaling to the error register 525. The signaling may result in the contents of the error register 525 being read. At 566, the error register 525 may transmit signaling to the controller 515. The signaling may include the contents of the error register 525. At 568, the controller 515 may transmit signaling to the pin(s) 530. For example, the controller 515 may transmit signaling to a pin driver (not shown) coupled with the pin(s) 530 that results in the pin driver driving a DMI or DSF pin. Accordingly, the pin driver may drive the DMI or DSF pin using a positive bias (e.g., the positive bias 340 as described with reference to FIG. 3). Accordingly, the DMI or DSF pin may be driven to and output a first value (e.g., a high value, a "1") that indicates the occurrence of the normal condition.

At 570, signaling indicating the first value may be transmitted to the host device 505 (e.g., via a signal trace). By storing and outputting the first value upon the occurrence of a normal condition, the memory device 510 may have the requisite power to actively drive the DMI or DSF pin to the first value when a normal condition exists.

Figure 6:
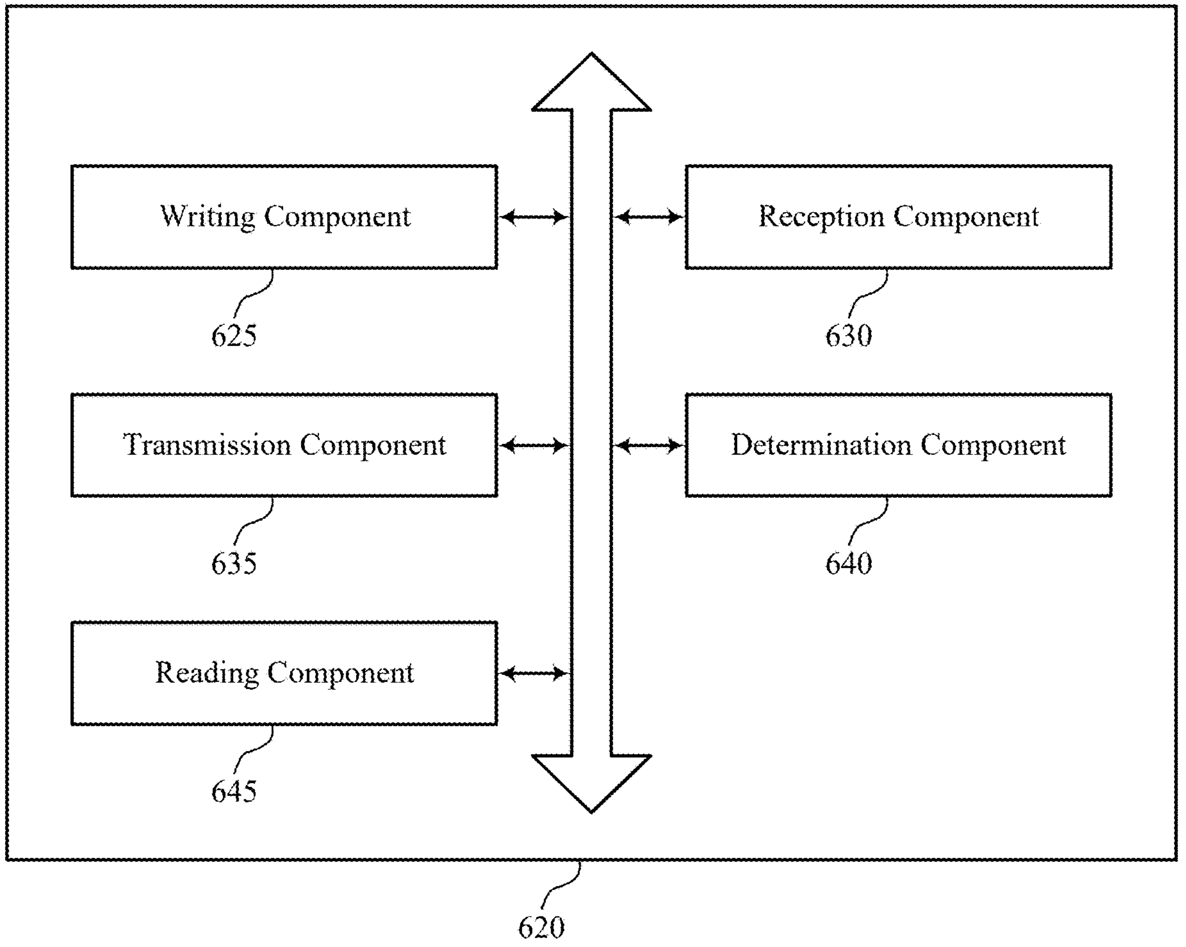
FIG. 6 shows a block diagram of a memory device that supports error detection signaling in accordance with examples as disclosed herein.

FIG. 6 shows a block diagram 600 of a memory device 620 that supports error detection signaling in accordance with examples as disclosed herein. The memory device 620 may be an example of aspects of a memory device as described with reference to FIGS. 1 through 5. The memory device 620, or various components thereof, may be an example of means for performing various aspects of error detection signaling as described herein. For example, the memory device 620 may include a writing component 625, a reception component 630, a transmission component 635, a determination component 640, a reading component 645, or any combination thereof. Each of these components may communicate, directly or indirectly, with one another (e.g., via one or more buses).

The writing component 625 may be configured as or otherwise support a means for writing, in a register of a memory device, an error state for a circuit of the memory device, where the error state includes a first value or a second value. In some examples, the writing component 625 may be configured as or otherwise support a means for writing, for a second time in the register of the memory device, a second error state for the circuit of the memory device.

In some examples, the writing component 625 may be configured as or otherwise support a means for writing, in a register of a memory device, an error state associated with the memory device based at least in part on determining the occurrence of the error associated with the memory device, where the stored error state includes the second value, where transmitting the signaling to the host device is based at least in part on storing the error state to the register of the memory device.

In some examples, the writing component 625 may be configured as or otherwise support a means for writing, in a register of a memory device, an error state associated with the memory device based at least in part on determining the occurrence of the error associated with the memory device, where the error state includes the second value, where transmitting the signaling to the host device is based at least in part on writing the error state to the register of the memory device.

The reception component 630 may be configured as or otherwise support a means for receiving, from a host device, a request to read the register. In some examples, the reception component 630 may be configured as or otherwise support a means for receiving, from the host device, a command for reading the register of the memory device based at least in part on writing the second error state to the register of the memory device. In some examples, the reception component 630 may be configured as or otherwise support a means for receiving, from a host device, a plurality of commands for accessing one or more memory arrays of a memory device.

In some examples, the reception component 630 may be configured as or otherwise support a means for receiving, from the host device, a second plurality of commands for accessing the one or more memory arrays of the memory device. In some examples, the reception component 630 may be configured as or otherwise support a means for receiving, from the host device, a command for reading the register of the memory device based at least in part on writing the second value to the register of the memory device, where transmitting the signaling to the host device is based at least in part on receiving the command from the host device.

In some examples, the reception component 630 may be configured as or otherwise support a means for receiving, from a host device, a plurality of commands for accessing one or more memory arrays of a memory device. In some examples, the reception component 630 may be configured as or otherwise support a means for receiving, from the host device, a second plurality of commands for accessing the one or more memory arrays of the memory device.

The transmission component 635 may be configured as or otherwise support a means for transmitting, to the host device, signaling including the first value or the second value in response to receiving the request to read the register, where the first value is associated with a positive bias of the memory device and indicates a normal condition associated with the circuit, and where the first value is different than the second value that is associated with a negative bias of the memory device that indicates an error condition associated with the circuit. In some examples, the transmission component 635 may be configured as or otherwise support a means for transmitting, to the host device, signaling including the first value or the second value in response to receiving the command from the host device.

In some examples, the transmission component 635 may be configured as or otherwise support a means for transmitting, to the host device, signaling including a second value based at least in part on determining the occurrence of the error associated with the memory device, where the second value is associated with a negative bias of the memory device and indicates the occurrence of the error associated with the memory device, and where the second value is different than a first value associated with a positive bias of the memory device that indicates an absence of the error associated with the memory device.

In some examples, the transmission component 635 may be configured as or otherwise support a means for transmitting, to the host device, signaling including the first value based at least in part on determining the absence of the error associated with the memory device.

In some examples, the transmission component 635 may be configured as or otherwise support a means for transmitting, to the host device from a pin coupled with a signal trace, signaling including a second value based at least in part on determining the occurrence of the error associated with the memory device, where the second value is associated with a termination voltage of the signal trace and indicates the occurrence of the error associated with the memory device, and where the second value is different than a first value that indicates an absence of the error associated with the memory device. In some examples, the transmission component 635 may be configured as or otherwise support a means for transmitting, to the host device, signaling including the first value based at least in part on determining the absence of the error associated with the memory device.

In some examples, the determination component 640 may be configured as or otherwise support a means for determining an error condition associated with the circuit, where writing the error state for the circuit in the register of the memory device includes writing the second value based at least in part on determining the error condition associated with the circuit. In some examples, the determination component 640 may be configured as or otherwise support a means for determining that the circuit is associated with the normal condition, where writing the error state for the circuit in the register of the memory device includes writing the first value based at least in part on determining that the circuit is associated with the normal condition.

The determination component 640 may be configured as or otherwise support a means for determining an occurrence of an error associated with the memory device based at least in part performing the plurality of commands received from the host device. In some examples, the determination component 640 may be configured as or otherwise support a means for determining an absence of an error associated with the memory device based at least in part performing the second plurality of commands received from the host device.

In some examples, the determination component 640 may be configured as or otherwise support a means for determining an occurrence of an error associated with the memory device based at least in part performing the plurality of commands received from the host device. In some examples, the determination component 640 may be configured as or otherwise support a means for determining an absence of an error associated with the memory device based at least in part performing the second plurality of commands received from the host device.

In some examples, the reading component 645 may be configured as or otherwise support a means for reading the register of the memory device based at least in part on writing the second value to the register of the memory device, where transmitting the signaling to the host device is based at least in part on reading the register of the memory device.

In some examples, the error condition associated with the circuit includes an error associated with a power supply of the memory device, an error associated with a clock of the memory device, an error associated with an access operation performed on the memory device, or a combination thereof. In some examples, the positive bias includes one or more supply inputs for supplying power to an output driver associated with the signaling including the first value or the second value. In some examples, the error associated with the memory device includes an error associated with a power supply of the memory device, an error associated with a clock of the memory device, an error associated with an access operation performed on the memory device, or a combination thereof.

In some examples, the positive bias includes one or more supply inputs for supplying power to an output driver associated with the signaling including the first value or the second value. In some examples, the error associated with the memory device includes an error associated with a power supply of the memory device, an error associated with a clock of the memory device, an error associated with an access operation performed on the memory device, or a combination thereof. In some examples, reading the register of the memory device occurs at a periodic interval.

Figure 7:
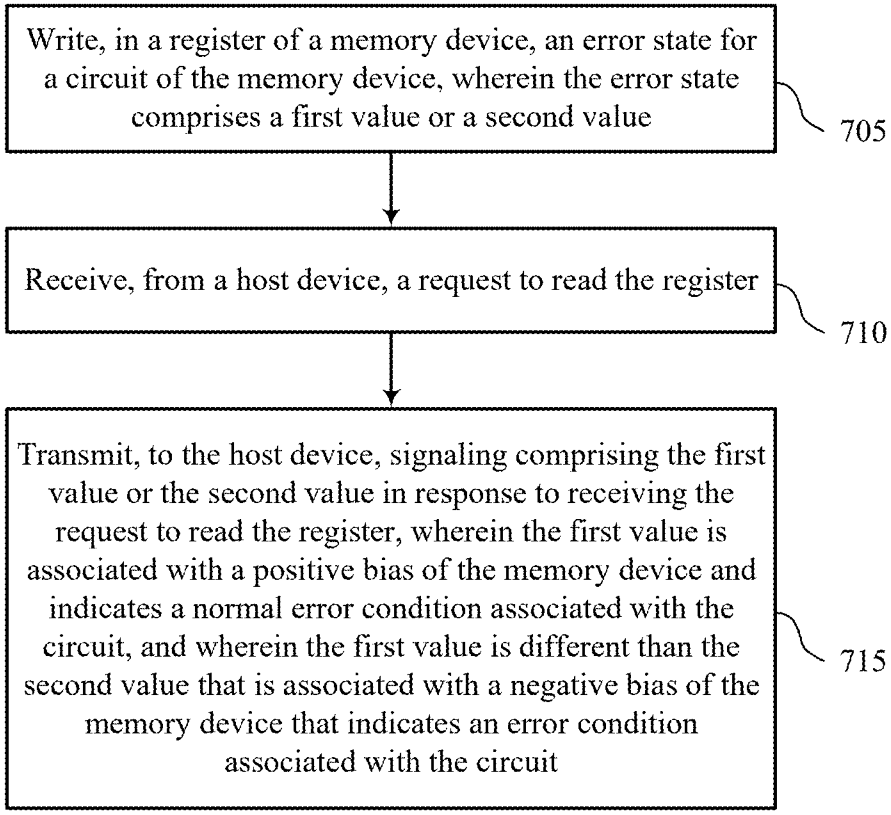
FIGS. 7 through 9 show flowcharts illustrating a method or methods that support error detection signaling in accordance with examples as disclosed herein.

FIG. 7 shows a flowchart illustrating a method 700 that supports error detection signaling in accordance with examples as disclosed herein. The operations of method 700 may be implemented by a memory device or its components as described herein. For example, the operations of method 700 may be performed by a memory device as described with reference to FIGS. 1 through 6. In some examples, a memory device may execute a set of instructions to control the functional elements of the device to perform the described functions. Additionally or alternatively, the memory device may perform aspects of the described functions using special-purpose hardware.

At 705, the method may include writing, in a register of a memory device, an error state for a circuit of the memory device, where the error state includes a first value or a second value. The operations of 705 may be performed in accordance with examples as disclosed herein. In some examples, aspects of the operations of 705 may be performed by a writing component 625 as described with reference to FIG. 6.

At 710, the method may include receiving, from a host device, a request to read the register. The operations of 710 may be performed in accordance with examples as disclosed herein. In some examples, aspects of the operations of 710 may be performed by a reception component 630 as described with reference to FIG. 6.

At 715, the method may include transmitting, to the host device, signaling including the first value or the second value in response to receiving the request to read the register, where the first value is associated with a positive bias of the memory device and indicates a normal condition associated with the circuit, and where the first value is different than the second value that is associated with a negative bias of the memory device that indicates an error condition associated with the circuit. The operations of 715 may be performed in accordance with examples as disclosed herein. In some examples, aspects of the operations of 715 may be performed by a transmission component 635 as described with reference to FIG. 6.

In some examples, an apparatus as described herein may perform a method or methods, such as the method 700. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for writing, in a register of a memory device, an error state for a circuit of the memory device, where the error state includes a first value or a second value; receiving, from a host device, a request to read the register; and transmitting, to the host device, signaling including the first value or the second value in response to receiving the request to read the register, where the first value is associated with a positive bias of the memory device and indicates a normal condition associated with the circuit, and where the first value is different than the second value that is associated with a negative bias of the memory device that indicates an error condition associated with the circuit.

Aspect 2: The apparatus of aspect 1, further including operations, features, circuitry, logic, means, or instructions, or any combination thereof for determining an error condition associated with the circuit, where writing the error state for the circuit in the register of the memory device includes writing the second value based at least in part on determining the error condition associated with the circuit.

Aspect 3: The apparatus of aspect 2, further including operations, features, circuitry, logic, means, or instructions, or any combination thereof for the error condition associated with the circuit includes an error associated with a power supply of the memory device, an error associated with a clock of the memory device, an error associated with an access operation performed on the memory device, or a combination thereof.

Aspect 4: The apparatus of any of aspects 1 through 3, further including operations, features, circuitry, logic, means, or instructions, or any combination thereof for determining that the circuit is associated with the normal condition, where writing the error state for the circuit in the register of the memory device includes writing the first value based at least in part on determining that the circuit is associated with the normal condition.

Aspect 5: The apparatus of any of aspects 1 through 4, further including operations, features, circuitry, logic, means, or instructions, or any combination thereof for writing, for a second time in the register of the memory device, a second error state for the circuit of the memory device; receiving, from the host device, a command for reading the register of the memory device based at least in part on writing the second error state to the register of the memory device; and transmitting, to the host device, signaling including the first value or the second value in response to receiving the command from the host device.

Aspect 6: The apparatus of any of aspects 1 through 5, further including operations, features, circuitry, logic, means, or instructions, or any combination thereof for the positive bias includes one or more supply inputs for supplying power to an output driver associated with the signaling including the first value or the second value.

Figure 8:
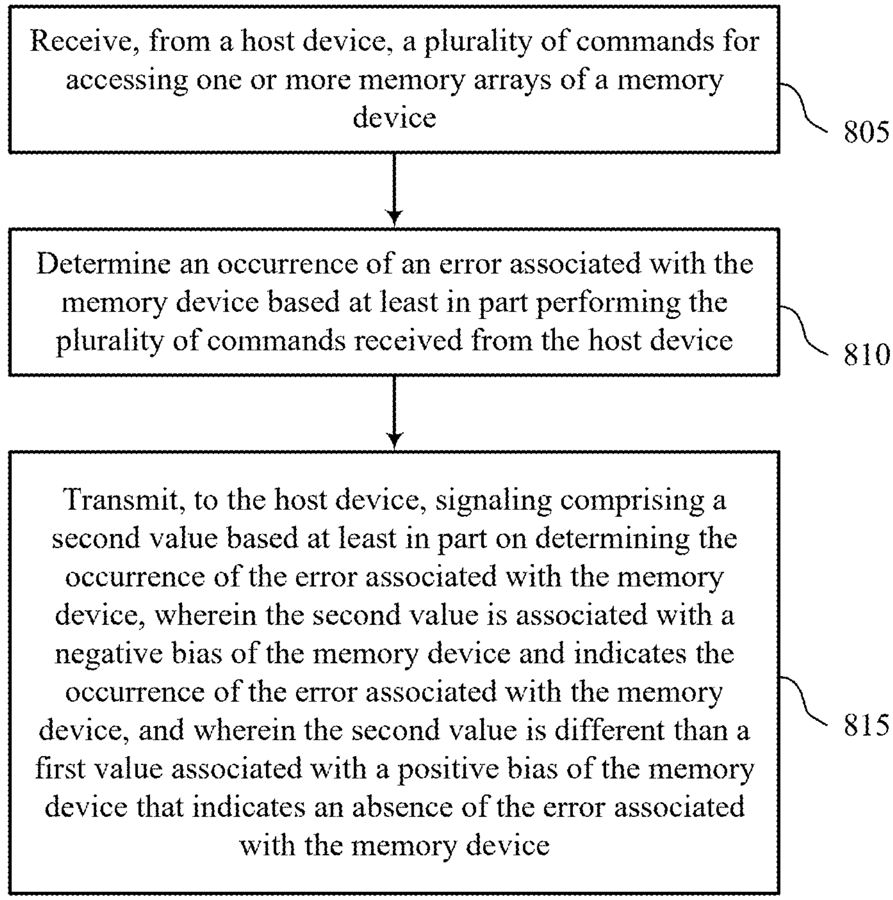

FIG. 8 shows a flowchart illustrating a method 800 that supports error detection signaling in accordance with examples as disclosed herein. The operations of method 800 may be implemented by a memory device or its components as described herein. For example, the operations of method 800 may be performed by a memory device as described with reference to FIGS. 1 through 6. In some examples, a memory device may execute a set of instructions to control the functional elements of the device to perform the described functions. Additionally or alternatively, the memory device may perform aspects of the described functions using special-purpose hardware.

At 805, the method may include receiving, from a host device, a plurality of commands for accessing one or more memory arrays of a memory device. The operations of 805 may be performed in accordance with examples as disclosed herein. In some examples, aspects of the operations of 805 may be performed by a reception component 630 as described with reference to FIG. 6.

At 810, the method may include determining an occurrence of an error associated with the memory device based at least in part performing the plurality of commands received from the host device. The operations of 810 may be performed in accordance with examples as disclosed herein. In some examples, aspects of the operations of 810 may be performed by a determination component 640 as described with reference to FIG. 6.

At 815, the method may include transmitting, to the host device, signaling including a second value based at least in part on determining the occurrence of the error associated with the memory device, where the second value is associated with a negative bias of the memory device and indicates the occurrence of the error associated with the memory device, and where the second value is different than a first value associated with a positive bias of the memory device that indicates an absence of the error associated with the memory device. The operations of 815 may be performed in accordance with examples as disclosed herein. In some examples, aspects of the operations of 815 may be performed by a transmission component 635 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor), or any combination thereof for performing the following aspects of the present disclosure:

Aspect 7: The apparatus, including features, circuitry, logic, means, or instructions, or any combination thereof for receiving, from a host device, a plurality of commands for accessing one or more memory arrays of a memory device; determining an occurrence of an error associated with the memory device based at least in part performing the plurality of commands received from the host device; and transmitting, to the host device, signaling including a second value based at least in part on determining the occurrence of the error associated with the memory device, where the second value is associated with a negative bias of the memory device and indicates the occurrence of the error associated with the memory device, and where the second value is different than a first value associated with a positive bias of the memory device that indicates an absence of the error associated with the memory device.

Aspect 8: The apparatus of aspect 7, further including operations, features, circuitry, logic, means, or instructions, or any combination thereof for receiving, from the host device, a second plurality of commands for accessing the one or more memory arrays of the memory device; determining an absence of an error associated with the memory device based at least in part performing the second plurality of commands received from the host device; and transmitting, to the host device, signaling including the first value based at least in part on determining the absence of the error associated with the memory device.

Aspect 9: The apparatus of any of aspects 7 through 8, further including operations, features, circuitry, logic, means, or instructions, or any combination thereof for the error associated with the memory device includes an error associated with a power supply of the memory device, an error associated with a clock of the memory device, an error associated with an access operation performed on the memory device, or a combination thereof.

Aspect 10: The apparatus of any of aspects 7 through 9, further including operations, features, circuitry, logic, means, or instructions, or any combination thereof for writing, in a register of a memory device, an error state associated with the memory device based at least in part on determining the occurrence of the error associated with the memory device, where the stored error state includes the second value, where transmitting the signaling to the host device is based at least in part on storing the error state to the register of the memory device.

Aspect 11: The apparatus of aspect 10, further including operations, features, circuitry, logic, means, or instructions, or any combination thereof for receiving, from the host device, a command for reading the register of the memory device based at least in part on writing the second value to the register of the memory device, where transmitting the signaling to the host device is based at least in part on receiving the command from the host device.

Aspect 12: The apparatus of any of aspects 7 through 11, further including operations, features, circuitry, logic, means, or instructions, or any combination thereof for the positive bias includes one or more supply inputs for supplying power to an output driver associated with the signaling including the first value or the second value.

Figure 9:
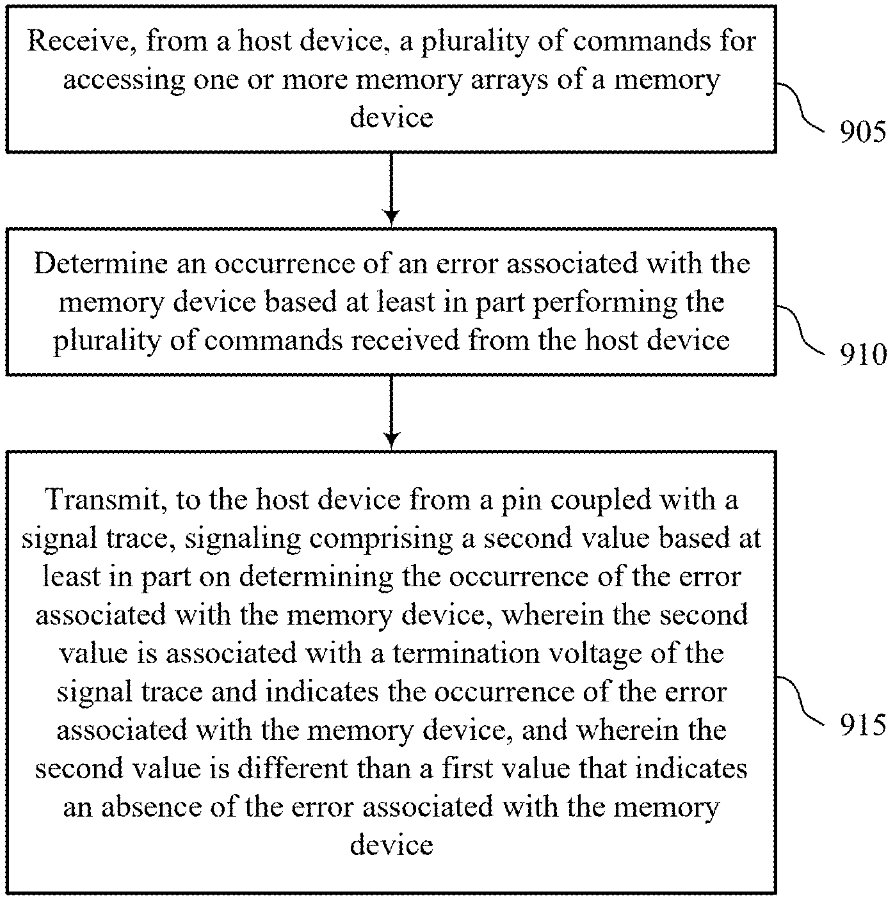

FIG. 9 shows a flowchart illustrating a method 900 that supports error detection signaling in accordance with examples as disclosed herein. The operations of method 900 may be implemented by a memory device or its components as described herein. For example, the operations of method 900 may be performed by a memory device as described with reference to FIGS. 1 through 6. In some examples, a memory device may execute a set of instructions to control the functional elements of the device to perform the described functions. Additionally or alternatively, the memory device may perform aspects of the described functions using special-purpose hardware.

At 905, the method may include receiving, from a host device, a plurality of commands for accessing one or more memory arrays of a memory device. The operations of 905 may be performed in accordance with examples as disclosed herein. In some examples, aspects of the operations of 905 may be performed by a reception component 630 as described with reference to FIG. 6.

At 910, the method may include determining an occurrence of an error associated with the memory device based at least in part performing the plurality of commands received from the host device. The operations of 910 may be performed in accordance with examples as disclosed herein. In some examples, aspects of the operations of 910 may be performed by a determination component 640 as described with reference to FIG. 6.

At 915, the method may include transmitting, to the host device from a pin coupled with a signal trace, signaling including a second value based at least in part on determining the occurrence of the error associated with the memory device, where the second value is associated with a termination voltage of the signal trace and indicates the occurrence of the error associated with the memory device, and where the second value is different than a first value that indicates an absence of the error associated with the memory device. The operations of 915 may be performed in accordance with examples as disclosed herein. In some examples, aspects of the operations of 915 may be performed by a transmission component 635 as described with reference to FIG. 6.

In some examples, an apparatus as described herein may perform a method or methods, such as the method 900. The apparatus may include, features, circuitry, logic, means, or instructions (e.g., a non-transitory computer-readable medium storing instructions executable by a processor), or any combination thereof for performing the following aspects of the present disclosure:

Aspect 13: The apparatus, including features, circuitry, logic, means, or instructions, or any combination thereof for receiving, from a host device, a plurality of commands for accessing one or more memory arrays of a memory device; determining an occurrence of an error associated with the memory device based at least in part performing the plurality of commands received from the host device; and transmitting, to the host device from a pin coupled with a signal trace, signaling including a second value based at least in part on determining the occurrence of the error associated with the memory device, where the second value is associated with a termination voltage of the signal trace and indicates the occurrence of the error associated with the memory device, and where the second value is different than a first value that indicates an absence of the error associated with the memory device.

Aspect 14: The apparatus of aspect 13, further including operations, features, circuitry, logic, means, or instructions, or any combination thereof for receiving, from the host device, a second plurality of commands for accessing the one or more memory arrays of the memory device; determining an absence of an error associated with the memory device based at least in part performing the second plurality of commands received from the host device; and transmitting, to the host device, signaling including the first value based at least in part on determining the absence of the error associated with the memory device.

Aspect 15: The apparatus of any of aspects 13 through 14, further including operations, features, circuitry, logic, means, or instructions, or any combination thereof for the error associated with the memory device includes an error associated with a power supply of the memory device, an error associated with a clock of the memory device, an error associated with an access operation performed on the memory device, or a combination thereof.

Aspect 16: The apparatus of any of aspects 13 through 15, further including operations, features, circuitry, logic, means, or instructions, or any combination thereof for writing, in a register of a memory device, an error state associated with the memory device based at least in part on determining the occurrence of the error associated with the memory device, where the error state includes the second value, where transmitting the signaling to the host device is based at least in part on writing the error state to the register of the memory device.

Aspect 17: The apparatus of aspect 16, further including operations, features, circuitry, logic, means, or instructions, or any combination thereof for reading the register of the memory device based at least in part on writing the second value to the register of the memory device, where transmitting the signaling to the host device is based at least in part on reading the register of the memory device.

Aspect 18: The apparatus of aspect 17, further including operations, features, circuitry, logic, means, or instructions, or any combination thereof for reading the register of the memory device occurs at a periodic interval.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 19: An apparatus, including: a register; a circuit coupled with the register; a positive bias coupled with the circuit; a negative bias coupled with the circuit; and a controller coupled with the register, the circuit, the positive bias, and the negative bias, where the controller is operable to cause the apparatus to: write, in the register, an error state for the circuit, where the stored error state includes a first value or a second value; receive, from a host device, a request to read the register; and transmit, to the host device, signaling including the first value or the second value in response to receiving the request to read the register, where the first value is associated with the positive bias and indicates that a normal condition associated with the circuit, and where the first value is different than the second value that is associated with the negative bias that indicates an error condition associated with the circuit.

Aspect 20: The apparatus of aspect 19, where the controller is operable to cause the apparatus to: determine an error condition associated with the circuit, where writing the error state for the circuit in the register includes writing the second value based at least in part on determining the error condition associated with the circuit.

Aspect 21: The apparatus of aspect 20, where the error condition associated with the circuit includes an error associated with a power supply of the apparatus, an error associated with a clock of the apparatus, an error associated with an access operation performed on the apparatus, or a combination thereof.

Aspect 22: The apparatus of any of aspects 19 through 21, where the controller is operable to cause the apparatus to: determine that the circuit is associated with the normal condition, where writing the error state for the circuit in the register includes writing the first value based at least in part on determining that the circuit is associated with the normal condition.

Aspect 23: The apparatus of any of aspects 19 through 22, where the controller is operable to cause the apparatus to: write, for a second time in the register, a second error state for the circuit; receive, from the host device, a command for reading the register based at least in part on writing the second error state to the register of the memory device; and transmit, to the host device, signaling including the first value or the second value based at least in part on receiving the command from the host device.

Aspect 24: The apparatus of any of aspects 19 through 23, further including: an output driver coupled with the positive bias, where the positive bias includes one or more supply inputs for supplying power to the output driver associated with the signaling including the first value or the second value.

An apparatus is described. The following provides an overview of aspects of the apparatus as described herein:

Aspect 25: An apparatus, including: a plurality of memory arrays; a positive bias coupled with the plurality of memory arrays; a negative bias coupled with the plurality of memory arrays; and a controller coupled with the plurality of memory arrays, the positive bias, and the negative bias, where the controller is operable to cause the apparatus to: receive, from a host device, a plurality of commands for accessing at least one memory array of the plurality of memory arrays; determine an occurrence of an error associated with the at least one of the plurality of memory arrays based at least in part performing the plurality of commands received from the host device; and transmit, to the host device, signaling including a second value based at least in part on determining the occurrence of the error associated with the at least one memory array, where the second value is associated with the negative bias and indicates the occurrence of the error associated with the at least one memory array, and where the second value is different than a first value associated with the positive bias that indicates an absence of the error associated with the at least one memory array.

Aspect 26: The apparatus of aspect 25, where the controller is operable to cause the apparatus to: receive, from the host device, a second plurality of commands for accessing at least one memory array of the plurality of memory arrays; determine an absence of an error associated with the at least one memory array based at least in part performing the second plurality of commands received from the host device; and transmit, to the host device, signaling including the first value based at least in part on determining the absence of the error associated with the at least one memory array.

Aspect 27: The apparatus of any of aspects 25 through 26, where the error associated with the at least one memory array includes an error associated with a power supply of the at least one memory array, an error associated with a clock of the at least one memory array, an error associated with an access operation performed on the at least one memory array, or a combination thereof.

Aspect 28: The apparatus of any of aspects 25 through 27, further including: a register coupled with the plurality of memory arrays, where the controller is operable to cause the apparatus to: write, in the register, an error state associated with the at least one memory array based at least in part on determining the occurrence of the error associated with the at least one memory array, where the error state includes the second value, where transmitting the signaling to the host device is based at least in part on writing the error state to the register.

Aspect 29: The apparatus of aspect 28, where the controller is operable to cause the apparatus to: receive, from the host device, a command for reading the register based at least in part on writing the second value to the register, where transmitting the signaling to the host device is based at least in part on receiving the command from the host device.

Aspect 30: The apparatus of any of aspects 25 through 29, further including: an output driver coupled with the positive bias, where the positive bias includes one or more supply inputs for supplying power to the output driver associated with the signaling including the first value or the second value.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms “electronic communication,” “conductive contact,” “connected,” and “coupled” may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term “coupling” refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

transmitting, to a memory device, a request to read a register of the memory device, wherein the register is configured to store one of a first value or a second value for an error state for a circuit of the memory device; and receiving, from the memory device, signaling that indicates the one of the first value or the second value for the error state in response to receiving the request to read the register, wherein the first value is associated with a positive bias of the memory device and indicates a normal condition associated with the circuit, and wherein the first value is different than the second value that is associated with a negative bias of the memory device that indicates an error condition associated with the circuit.

2. The method of claim 1, further comprising:

transmitting, to the memory device, a plurality of commands comprising one or more read commands, one or more write commands, or both.

3. The method of claim 1, wherein the second value is associated with multiple bits of the signaling being associated with the negative bias of the memory device.

4. The method of claim 1, wherein the error condition associated with the circuit comprises an error associated with a power supply of the memory device, an error associated with a clock of the memory device, an error associated with an access operation performed on the memory device, or a combination thereof.

5. The method of claim 1, further comprising:

transmitting a command for reading the register of the memory device, the register associated with a second error state for the circuit of the memory device.

6. The method of claim 5, further comprising:

receiving, from the memory device, signaling comprising the first value or the second value in response to transmitting the command.

7. The method of claim 1, wherein the positive bias comprises one or more supply inputs for supplying power to an output driver associated with the signaling comprising the first value or the second value.

8. A method, comprising:

transmitting, to a memory device, a plurality of commands for accessing one or more memory arrays of a memory device; and receiving, from the memory device, signaling that indicates a second value for an error state associated with the memory device based at least in part on the plurality of commands, wherein the second value is received by detecting a negative bias of the memory device and indicates an occurrence of an error associated with the memory device, and wherein the second value is different than a first value received by detecting a positive bias of the memory device that indicates an absence of the error associated with the memory device.

9. The method of claim 8, further comprising:

transmitting, to the memory device, a second plurality of commands for accessing the one or more memory arrays of the memory device.

10. The method of claim 9, further comprising:

receiving, from the memory device, signaling comprising the first value based at least in part on the second plurality of commands.

11. The method of claim 8, wherein the error associated with the memory device comprises an error associated with a power supply of the memory device, an error associated with a clock of the memory device, an error associated with an access operation performed on the memory device, or a combination thereof.

12. The method of claim 8, wherein the plurality of commands comprises one or more read commands, one or more write commands, or both.

13. The method of claim 8, further comprising:

transmitting, to the memory device, a command for reading a register of the memory device, wherein receiving the signaling indicating the second value is based at least in part on transmitting the command.

14. The method of claim 8, wherein the signaling is communicated via a data mask invert (DMI) pin or a special function enable (DSF) pin.

15. A host device, comprising:

an input/output system; and a processor coupled with the input/output system and configured to cause the host device to:

transmit, to a memory device, a request to read a register of the memory device, wherein the register is configured to store one of a first value or a second value for an error state for a circuit of the memory device; and receive, from the memory device, signaling that indicates the one of the first value or the second value for the error state in response to receiving the request to read the register, wherein the first value is associated with a positive bias of the memory device and indicates a normal condition associated with the circuit, and wherein the first value is different than the second value that is associated with a negative bias of the memory device that indicates an error condition associated with the circuit.

16. The host device of claim 15, wherein the processor is further configured to cause the host device to:

transmitting, to the memory device, a plurality of commands comprising one or more read commands, one or more write commands, or both.

17. The host device of claim 16, wherein the plurality of commands comprises the request to read the register.

18. The host device of claim 15, wherein the error condition associated with the circuit comprises an error associated with a power supply of the memory device, an error associated with a clock of the memory device, an error associated with an access operation performed on the memory device, or a combination thereof.

19. The host device of claim 15, wherein the processor is further configured to cause the host device to:

transmit a command for reading the register of the memory device, the register associated with a second error state for the circuit of the memory device.

20. The host device of claim 19, wherein the processor is further configured to cause the host device to:

receive, from the memory device, signaling comprising the first value or the second value in response to transmitting the command.

* * * * *